United States Patent
Hotani et al.

(10) Patent No.: US 9,285,769 B2
(45) Date of Patent: Mar. 15, 2016

(54) IMAGE FORMING APPARATUS INCLUDING A DUCT FOR AIRFLOW HAVING A SECTIONAL AREA THAT BECOMES GRADUALLY SMALLER TOWARD A PART OF A ROTATING SHAFT EXPOSED INTO THE DUCT

(71) Applicant: KYOCERA Document Solutions Inc., Osaka (JP)

(72) Inventors: Tomoya Hotani, Osaka (JP); Masaaki Maruta, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/712,106

(22) Filed: May 14, 2015

(65) Prior Publication Data
US 2015/0331387 A1  Nov. 19, 2015

(30) Foreign Application Priority Data
May 19, 2014 (JP) .................................. 2014-103007

(51) Int. Cl.
G03G 21/20 (2006.01)
G02B 26/08 (2006.01)
G02B 26/10 (2006.01)
G03G 15/04 (2006.01)
G03G 21/16 (2006.01)

(52) U.S. Cl.
CPC .......... *G03G 21/206* (2013.01); *G02B 26/0833* (2013.01); *G02B 26/105* (2013.01); *G03G 15/04045* (2013.01); *G03G 21/1666* (2013.01)

(58) Field of Classification Search
CPC .............................................. G03G 2221/1645
See application file for complete search history.

(56) References Cited

U.S. PATENT DOCUMENTS 6,356,722 B1 * 3/2002 Kida .................. H04N 1/00519
399/92
2008/0025750 A1 * 1/2008 Yamazaki ............ G02B 26/121
399/92

FOREIGN PATENT DOCUMENTS

JP    09090854 A  *  4/1997
JP    2002-072124     3/2002
JP    2005091413 A *  4/2005

* cited by examiner

*Primary Examiner* — Clayton E LaBalle
*Assistant Examiner* — Victor Verbitsky
(74) *Attorney, Agent, or Firm* — Wenderoth, Lind & Ponack, L.L.P.

(57) ABSTRACT

An image forming apparatus includes an optical scanning device, a duct, and a cooling fan. The optical scanning device has a rotating polygon mirror, a motor which has a rotating shaft fixed to the rotating polygon mirror, and a housing that accommodates the rotating polygon mirror and the motor. The duct is disposed adjacent to the optical scanning device, and a part of the rotating shaft is exposed into the duct. The cooling fan generates airflow inside the duct. A sectional area of the duct becomes gradually small toward the part of the rotating shaft exposed into the duct from an upstream side of the part of the rotating shaft exposed into the duct with respect to a flow direction of the airflow in the duct, and a sectional area of the duct becomes large at a downstream side of the part of the rotating shaft exposed into the duct.

6 Claims, 7 Drawing Sheets

IMAGE FORMING APPARATUS INCLUDING A DUCT FOR AIRFLOW HAVING A SECTIONAL AREA THAT BECOMES GRADUALLY SMALLER TOWARD A PART OF A ROTATING SHAFT EXPOSED INTO THE DUCT

CROSS-REFERENCE TO RELATED APPLICATION

This application is based upon and claims the benefit of priority from Japanese Patent Application No. 2014-103007 filed on May 19, 2014, the entire contents of which are incorporated herein by reference.

BACKGROUND

The technology of the present disclosure relates to an image forming apparatus including an optical scanning device that forms a latent image on a surface to be scanned by exposure scanning, such as a copy machine, a printer, a facsimile, and a multifunctional peripheral thereof.

Conventionally, in an optical scanning device used in an image forming apparatus, the surface (the surface to be scanned) of an image carrying member is exposed and scanned and a latent image is formed on the image carrying member. In order to expose and scan beam light onto the image carrying member, when the beam light is deflected, since a rotating polygon mirror such as a polygon mirror rotates at a high speed, both a rotating shaft of a motor that rotationally drives the rotating polygon mirror and a bearing part thereof generate heat. When the heat generated in the motor rotating shaft and the bearing part is filled in a housing of the optical scanning device and the housing becomes high temperature, since the housing and an optical member such as a lens or a mirror accommodated in the housing may be thermally deformed, it is not possible to form a good latent image on the surface of the image carrying member due to the thermal deformation of the housing and an optical member.

In this regard, there has been known various technologies for suppressing an increase in the temperature of the optical scanning device due to the heat generated in the motor rotating shaft and the bearing part. As one example of the technologies, there has been proposed a configuration in which a mounting part of a polygon motor of the housing for accommodating the polygon motor is made of a member having high thermal conductivity such as aluminum material, a duct for allowing air from a fan to pass therethrough is disposed at a position just below the polygon motor, and the air is blown into the mounting part of the polygon motor, so that a polygon motor bearing part is cooled.

SUMMARY

An image forming apparatus according to one aspect of the present disclosure includes an optical scanning device, a duct, and a cooling fan. The optical scanning device has a rotating polygon mirror that deflects and scans beam light from a light source unit with respect to a surface to be scanned, a motor having a rotating shaft to which the rotating polygon mirror is fixed and rotationally driving the rotating polygon mirror, and a housing that accommodates the rotating polygon mirror and the motor. The duct is disposed adjacent to the optical scanning device, and a part of the rotating shaft is exposed into the duct. The cooling fan generates airflow that flows inside the duct. A sectional area of the duct becomes gradually small toward the part of the rotating shaft exposed into the duct from an upstream side of the part of the rotating shaft exposed into the duct with respect to the flow direction of the airflow in the duct, and a sectional area of the duct becomes large at a downstream side of the part of the rotating shaft exposed into the duct.

DETAILED DESCRIPTION

Figure 1:
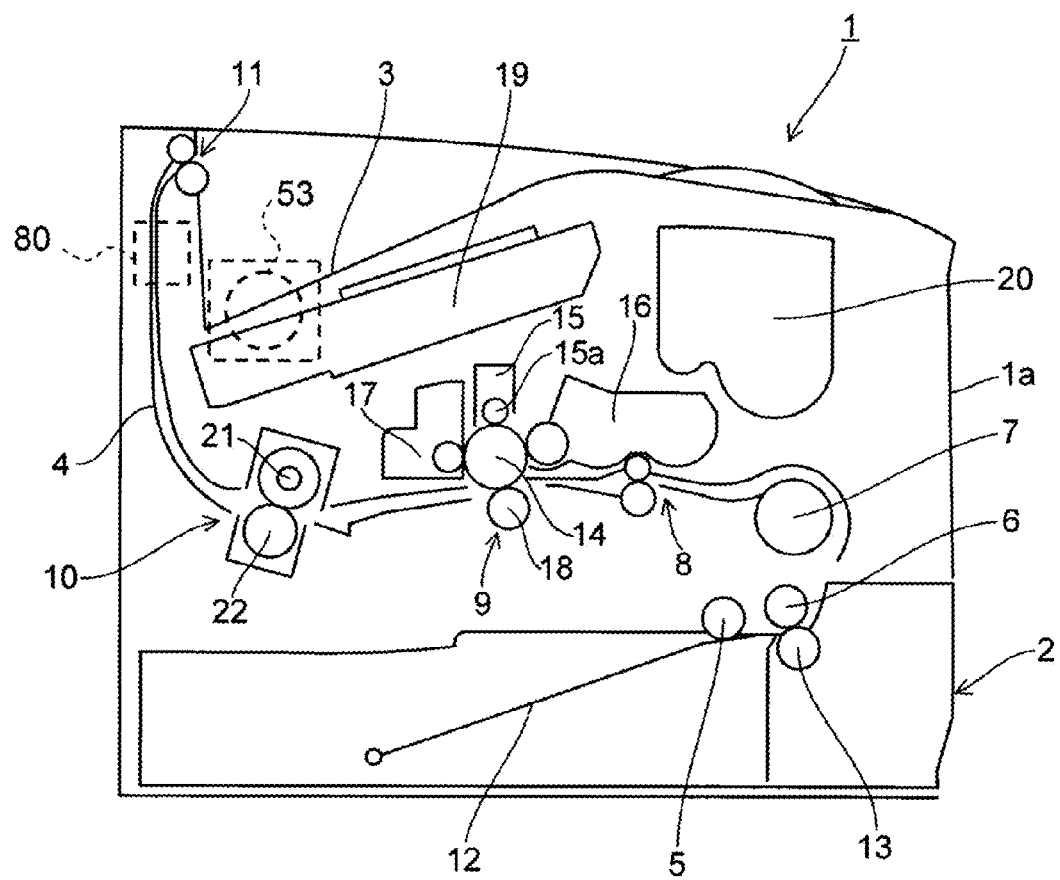
FIG. 1 is a sectional view illustrating a schematic configuration of an image forming apparatus 1 according to the present embodiment.

Hereinafter, the present embodiment will now be described with reference to the drawings. FIG. 1 is a schematic configuration diagram illustrating an entire configuration of an image forming apparatus 1 according to the present embodiment, and illustrates the right side as a front side of the image forming apparatus 1. At a lower portion of an apparatus body 1a of the image forming apparatus 1, a paper feeding cassette 2 for accommodating loaded papers is disposed. Above the paper feeding cassette 2, a paper conveyance path 4 is formed to extend substantially horizontally from the front side to the rear side of the apparatus body 1a, to further extent upward, and to reach a paper discharge unit 3 formed on the upper surface of the apparatus body 1a. Sequentially from an upstream side along the paper conveyance path 4, a pick-up roller 5, a feed roller 6, an intermediate conveying roller 7, a resist roller pair 8, an image forming unit 9, a fixing unit 10, and a discharge roller pair 11 are disposed.

The paper feeding cassette 2 is provided with a paper loading plate 12 rotatably supported to the paper feeding cassette 2. It is configured that when papers loaded on the paper loading plate 12 have been sent out toward the paper conveyance path 4 by the pick-up roller 5 and a plurality of papers have been simultaneously sent out by the pick-up roller 5, the papers are loosened by the feed roller 6 and a retard roller 13 and only one uppermost paper is conveyed. The papers sent out to the paper conveyance path 4 are conveyed to the resist roller pair 8 by the intermediate conveying roller 7 by changing the conveyance direction to the rear side of the apparatus body 1a, and are supplied to the image forming unit 9 by the resist roller pair 8 with its timing adjusted.

The image forming unit 9 forms a predetermined toner image on a paper by an electrophotographic process, and includes a photosensitive drum 14 serving as an image carrying member pivotally supported to be rotatable clockwise in FIG. 1, and a charging device 15, a developing device 16, a cleaning device 17, a transfer roller 18, and an optical scanning device 19 disposed in the vicinity of the photosensitive drum 14, wherein the transfer roller 18 is disposed so as to face the photosensitive drum 14 while interposing the paper conveyance path 4 therebetween, and the optical scanning device 19 is disposed above the photosensitive drum 14. Above the developing device 16, a toner container 20 for refilling toner to the developing device 16 is disposed.

Furthermore, the photosensitive drum 14, the charging device 15, and the cleaning device 17 are unitized. In addition, in the image forming unit 9, a unit including the photosensitive drum 14, the charging device 15, and the cleaning device 17 will be hereinafter referred to as a drum unit 51 (see FIG. 4).

The charging device 15 includes a conductive rubber roller 15a connected to a power supply (not illustrated), wherein the conductive rubber roller 15a is disposed so as to abut the photosensitive drum 14. When the photosensitive drum 14 rotates, the conductive rubber roller 15a contacts with the surface of the photosensitive drum 14 and is driven to rotate. At this time, a predetermined voltage is applied to the conductive rubber roller 15a, so that the surface of the photosensitive drum 14 is uniformly charged.

Next, an electrostatic latent image based on input image data is formed on the photosensitive drum 14 by beam light emitted from the optical scanning device 19, and toner is attached to the electrostatic latent image by the developing device 16, so that a toner image is formed on the surface of the photosensitive drum 14. Then, a paper is supplied from the resist roller pair 8 to a nip portion (a transfer position) between the photosensitive drum 14 and the transfer roller 18 at a predetermined timing, so that the toner image of the surface of the photosensitive drum 14 is transferred onto the paper by the transfer roller 18.

The paper with the transferred toner image is separated from the photosensitive drum 14 and is conveyed toward the fixing unit 10. The fixing unit 10 is disposed at a downstream side of the image forming unit 9 with respect to the paper conveyance direction, and the paper with the transferred toner image in the image forming unit 9 is heated and pressed by a heating roller 21 and a pressing roller 22 brought into press-contact with the heating roller 21, which are provided in the fixing unit 10, so that the toner image transferred onto the paper is fixed.

The image-formed paper is discharged to the paper discharge unit 3 by the discharge roller pair 11. On the other hand, toner remaining on the surface of the photosensitive drum 14 after the transfer is removed by the cleaning device 17. The photosensitive drum 14 is charged again by the charging device 15, and the image formation is performed in the same manner.

In the vicinity of the optical scanning device 19, an intake fan (a cool fan) 53 for inhaling external air into the apparatus body 1a is disposed. Furthermore, a conveyance motor for rotationally driving a conveying roller including a discharge roller pair 11 is disposed above the rear portion of the apparatus body 1a.

Figure 2:
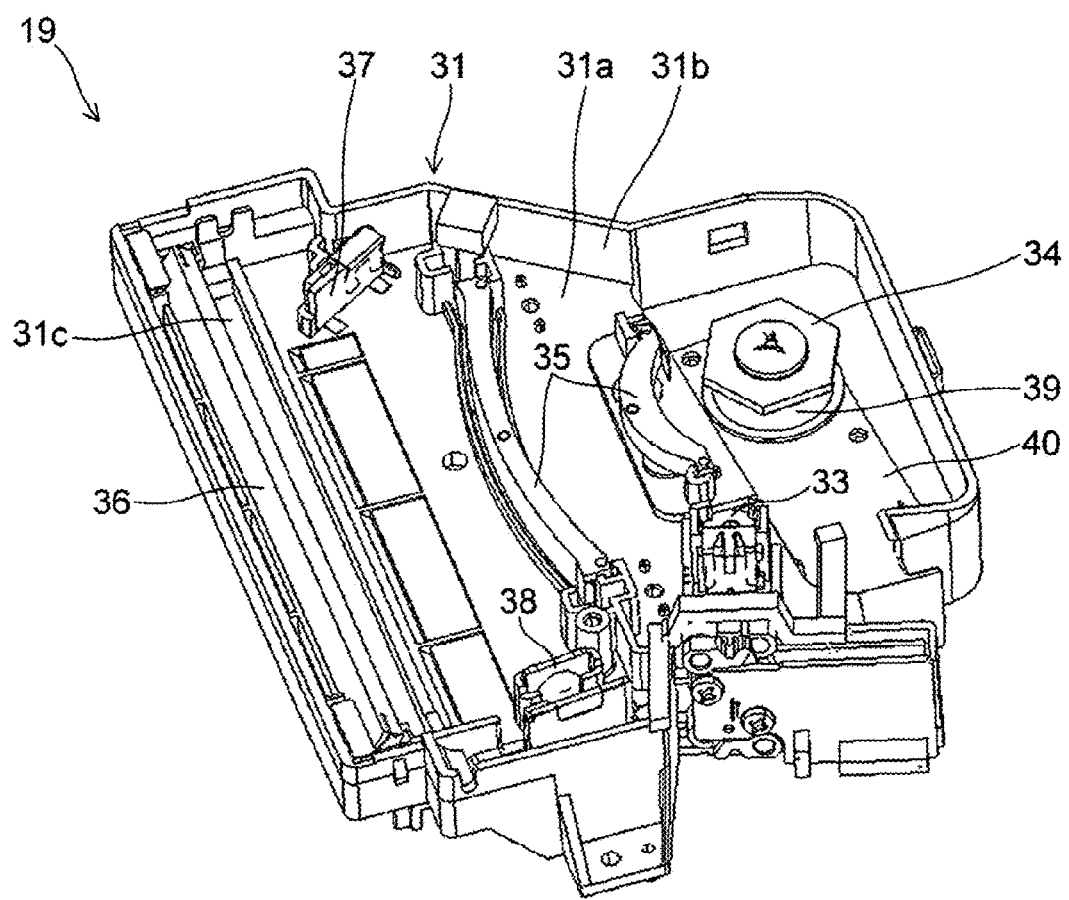
FIG. 2 is a perspective view illustrating an internal structure of an optical scanning device 19 mounted in an image forming apparatus 1.

FIG. 2 is a perspective view of the optical scanning device 19 mounted in the image forming apparatus 1. In addition, FIG. 2 illustrates the state in which an upper lid of a housing has been removed in order to illustrate the inner structure of the optical scanning device 19.

The optical scanning device 19 includes a light source unit 33, a polygon mirror 34 serving as a rotating polygon mirror, a polygon motor 39 for rotationally driving the polygon mirror 34, a scanning optical system 35, a folding mirror 36, and a detection sensor 38.

The light source unit 33 has a light source such as a laser diode for outputting laser light, and a cylindrical lens, a collimate lens and the like for shaping a beam diameter of the laser light, and outputs beam light modulated on the basis of image data input from a personal computer and the like (not illustrated).

The polygon mirror 34 is rotated by the polygon motor 39 at a predetermined speed, and deflects the beam light output from the light source unit 33 by using a reflective mirror surface provided at a side thereof. The polygon motor 39 is driven and controlled by a driver circuit provided in a circuit board 40.

The scanning optical system 35 includes a plurality of lenses, and converts the beam light reflected by the polygon mirror 34 so as to be scanned at a constant speed, and forms an image of the beam light on a surface to be scanned. The folding mirror 36 reflects the beam light output from the scanning optical system 35 toward the lower side of the scanning optical system 35, and leads the beam light to the photosensitive drum 14 (see FIG. 1).

The detection sensor 38 outputs a signal for controlling an exposure range (a writing timing) of a scanning direction, and receives the beam light having passed through the scanning optical system 35 via the detection mirror 37 disposed out of the exposure range.

In the aforementioned configuration, the light source unit 33 outputs the beam light modulated on the basis of image data toward the polygon mirror 34. The polygon mirror 34 reflects the beam light from the light source unit 33, and deflects and scans the reflected light by the rotation thereof. The scanning optical system 35 converts the beam light reflected by the polygon mirror 34 into constant speed scanning light, and forms an image of the constant speed scanning light on the photosensitive drum 14 (see FIG. 1) serving as a surface to be scanned via the folding mirror 36. In this way, the optical scanning device 19 exposes and scans a predetermined range on the photosensitive drum 14 in the scanning direction, so that an electrostatic latent image is formed on the photosensitive drum 14.

The light source unit 33, the polygon mirror 34, the polygon motor 39, the scanning optical system 35, and the folding mirror 36 are disposed in a housing 31.

The housing 31 has a bottom surface portion 31a, a side wall portion 31b rising from a peripheral edge of the bottom surface portion 31a, and the upper lid (not illustrated) mounted on an upper edge of the side wall portion 31b, and is formed in a predetermined shape by using resin. In a space formed by the bottom surface portion 31a, the side wall portion 31b, and the upper lid, the light source unit 33, the polygon mirror 34, the polygon motor 39, the scanning optical system 35, and the folding mirror 36 are accommodated.

The scanning optical system 35, the detection mirror 37, and the detection sensor 38 are fixed to predetermined positions of the bottom surface portion 31a. In order to reflect beam light toward the photosensitive drum 14 (see FIG. 1) via an outlet 31c, the folding mirror 36 is inclined with respect to the bottom surface portion 31a by a predetermined angle (about 15°) and is fixed to the bottom surface portion 31a.

The polygon mirror 34 is integrally mounted at a rotating shaft of the polygon motor 39, and the polygon motor 39 is fixed to the bottom surface portion 31a while interposing the circuit board 40 between the polygon motor 39 and the bottom surface portion 31a. The circuit board 40 is provided with a driver IC and the like for controlling the rotation driving of the polygon motor 39, and is fixed to the bottom surface portion 31a. In addition, the circuit board 40 may be disposed at other parts of the bottom surface portion 31a, or may be disposed at an upper portion of the housing 31 such as the upper lid.

The polygon motor 39 includes a magnet as a rotor and a stator having a core member wound with a coil, and rotatably supports a rotating shaft 41 (see FIG. 5) via a bearing, wherein the end surface of the rotating shaft 41 is sealed by a resin adhesive in order to encapsulate oil inside the bearing. When the polygon motor 39 rotates at a high speed for a long time, the coil and the like of the polygon motor 39 generates heat and the heat is conducted to the rotating shaft 41, resulting in an increase in the internal temperature of the housing 31.

Figure 3:
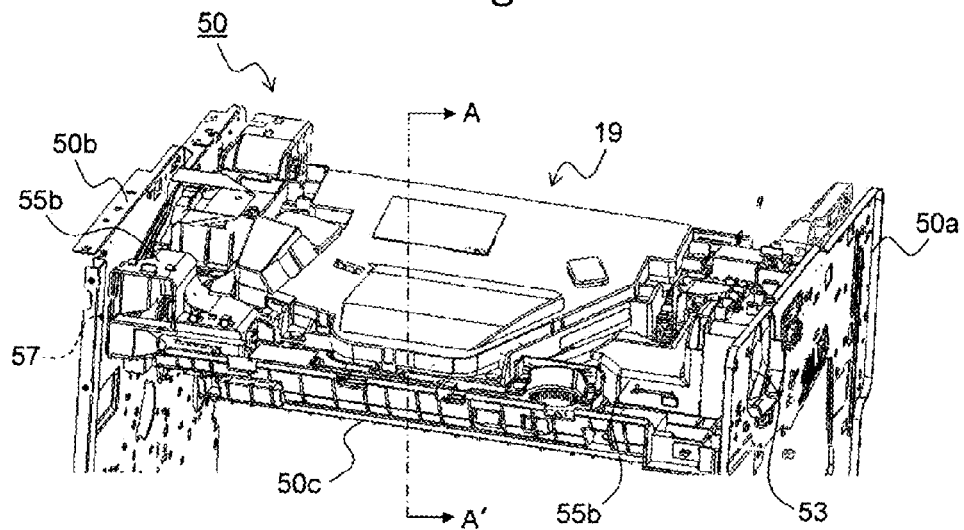
FIG. 3 is a perspective view illustrating an aspect in which a body frame 50 is supported to an optical scanning device 19.
Figure 4:
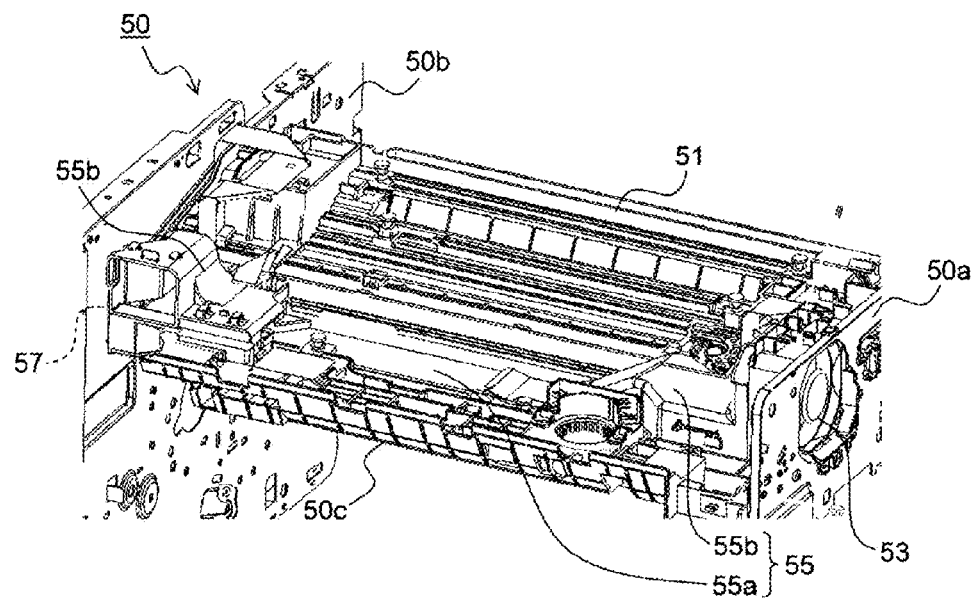
FIG. 4 is a perspective view illustrating a state in which an optical scanning device 19 has been removed from a body frame 50 from the state of FIG. 3.
Figure 5:
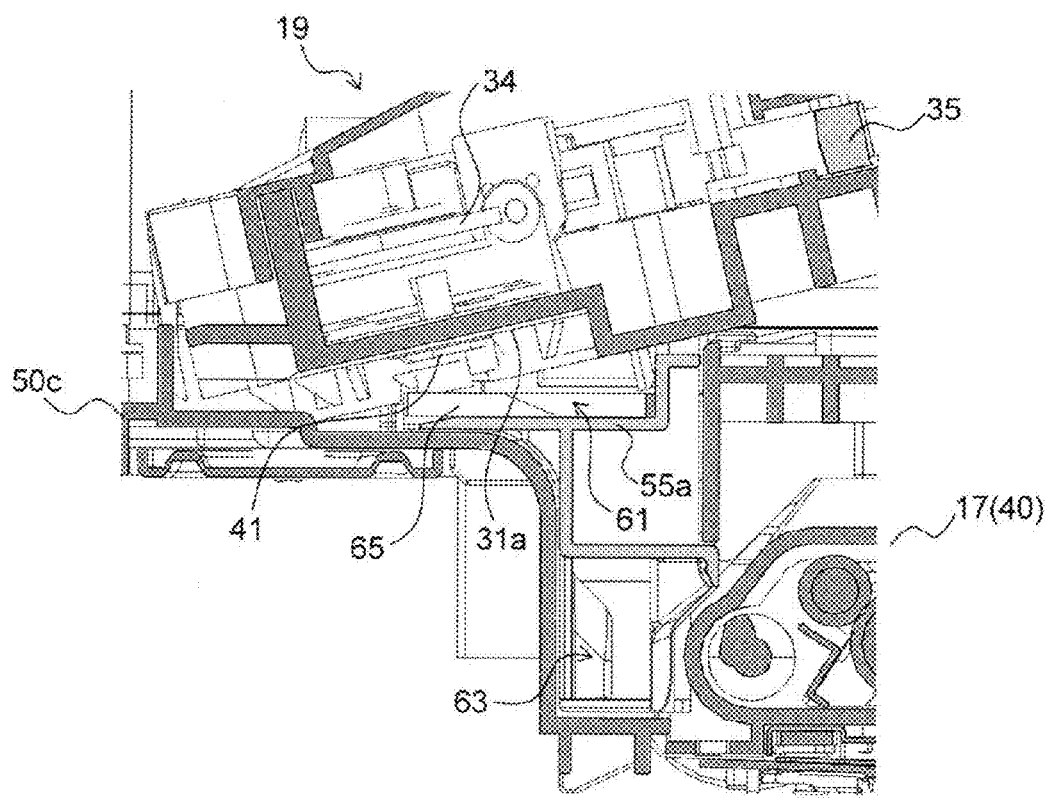
FIG. 5 is a sectional view of the vicinity of a rotating shaft 41 of a polygon motor 39 in FIG. 3.

FIG. 3 is a perspective view illustrating an aspect in which a body frame 50 is supported to the optical scanning device 19, FIG. 4 is a perspective view illustrating the state in which the optical scanning device 19 has been removed from the body frame 50 from the state of FIG. 3, and FIG. 5 is a sectional view of the vicinity of the rotating shaft 41 of the polygon motor 39 (a sectional view taken along line AA' of FIG. 3).

As illustrated in FIG. 3 and FIG. 4, the body frame 50 has a front frame plate 50a and a rear frame plate 50b disposed at a front side and a back side of the apparatus body 1a, and a connection frame 50c fixed as a bridge between the front frame plate 50a and the rear frame plate 50b.

The drum unit 51 is supported to the connection frame 50c, and the optical scanning device 19 is supported above the drum unit 51. The front frame plate 50a is provided with the intake fan 53 for introducing external air into the apparatus body 1a, and a duct member 55 having a lower duct part 55a and an upper duct part 55b is connected to the intake fan 53. The duct member 55 forms a first duct 61 for guiding airflow from the intake fan 53 to an exhaust port 57 of the rear frame plate 50b by allowing the airflow to pass through below the optical scanning device 19.

The upper duct part 55b of the duct member 55 is not formed at a part abutted by the bottom surface portion 31a of the housing 31 of the optical scanning device 19, and the first duct 61 is formed by the bottom surface portion 31a of the housing 31 and the lower duct part 55a. In this way, as illustrated in FIG. 5, a part of the rotating shaft 41 of the polygon motor 39 is exposed to an inner side of the first duct 61 from the bottom surface portion 31a of the housing 31.

Figure 6:
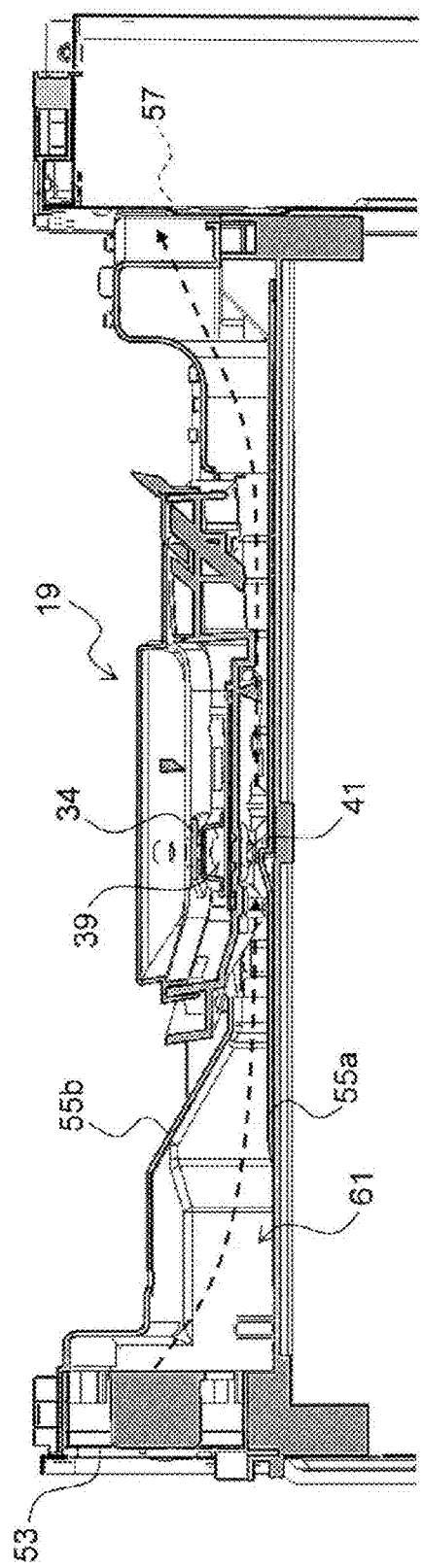
FIG. 6 is a side sectional view of a first duct 61 taken along a longitudinal direction (a direction vertical to a paper surface of FIG. 5).
Figure 7:
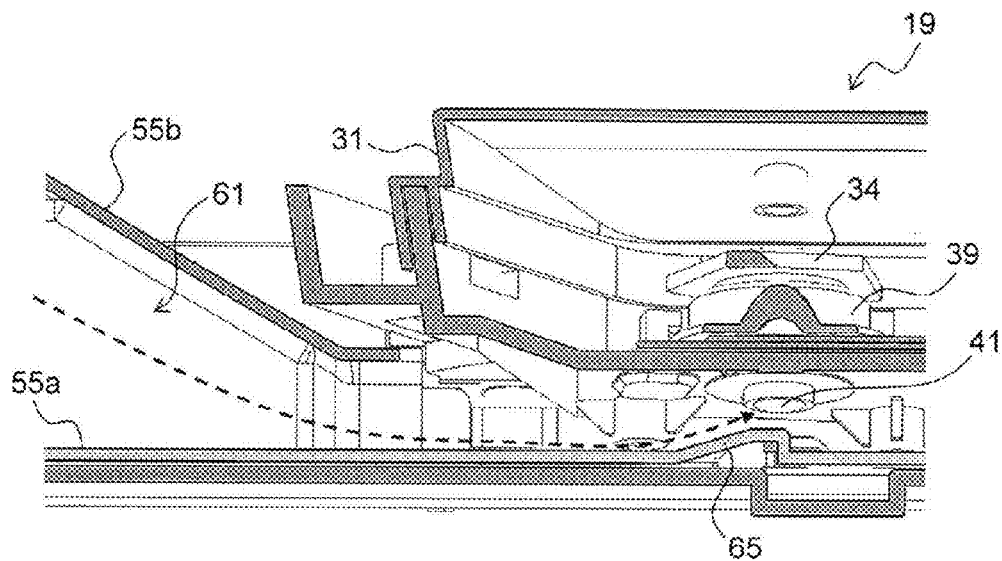
FIG. 7 is an enlarged view of the vicinity of a polygon motor 39 in FIG. 6.
Figure 8:
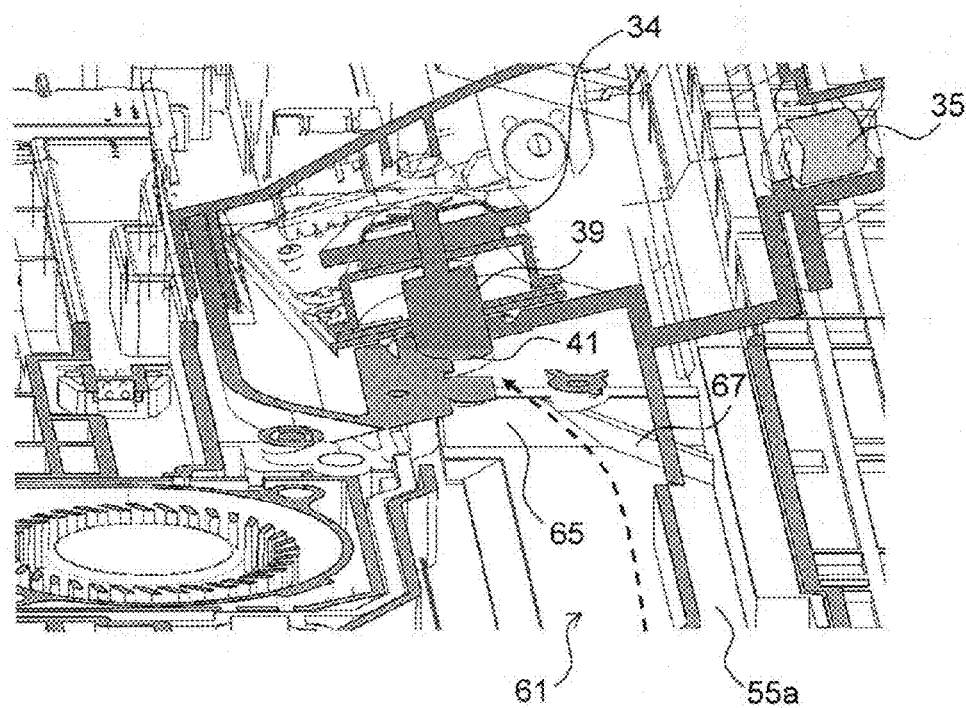
FIG. 8 is a sectional view of a first duct 61 and an optical scanning device 19 when viewed from an intake fan 53 side (the left direction of FIG. 7).

FIG. 6 is a side sectional view of the first duct 61 taken along a longitudinal direction (a direction vertical to the paper surface of FIG. 5), FIG. 7 is an enlarged view of the vicinity of the polygon motor 39 in FIG. 6, and FIG. 8 is a sectional view of the first duct 61 and the optical scanning device 19 when viewed from the intake fan 53 side (the left direction of FIG. 7). With reference to FIG. 6 to FIG. 8, the behavior of airflow in the first duct 61 will be described in detail.

Air inhaled by the intake fan 53 from the exterior of the apparatus body 1a passes through below the bottom surface portion 31a of the optical scanning device 19 along an air path of the first duct 61 gradually narrowed toward the optical scanning device 19.

The lower duct part 55a constituting the first duct 61 is provided with a first inclination surface 65, which is inclined in a direction approaching the rotating shaft 41, at a position close to the upstream side of the polygon motor 39 with respect to the flow direction of the airflow (the direction of a broken line arrow of FIG. 6 and FIG. 7). In this way, as illustrated in FIG. 7, the airflow flowing along the lower surface (the lower duct member 55a) of the first duct 61 is induced to the part of the rotating shaft 41, which is exposed into the first duct 61, by the first inclination surface 65.

Furthermore, the lower duct part 55a is provided with a second inclination surface 67 inclined toward the center from one inner side surface of the first duct 61 (the right inner side surface of FIG. 8). In this way, as illustrated in FIG. 8, the airflow flowing along the right inner side surface of the first duct 61 is induced to the part of the rotating shaft 41, which is exposed into the first duct 61, by the second inclination surface 67.

As described above, the first inclination surface 65 and the second inclination surface 67 are formed, so that the section area of the first duct 61 becomes small toward the part of the rotating shaft 41 exposed into the first duct 61. In this way, the airflow flowing through the first duct 61 is converged in the part of the rotating shaft 41 exposed into the first duct 61 and thus the speed of the airflow increases in the vicinity of the rotating shaft 41. Accordingly, the airflow flowing through the first duct 61 can be efficiently made contact with the part of the rotating shaft 41 exposed into the first duct 61 and the speed of the airflow made contact with the part of the rotating shaft 41 can be increased, so that it is possible to enhance the cooling effect of the rotating shaft 41.

On the other hand, at the downstream side of the part of the rotating shaft 41 exposed into the first duct 61 with respect to the flow direction of the airflow (the direction of the broken line arrow of FIG. 6 and FIG. 7), a space in the first duct 61 is opened such that the sectional area of the first duct 61 becomes gradually large. In this way, it is possible to reduce pressure loss of the airflow flowing inside the first duct 61, so that it is possible to facilitate the replacement of air in the first duct 61. Furthermore, since the energy efficiency of the intake fan 53 becomes high, it is possible to reduce power consumption.

Figure 9:
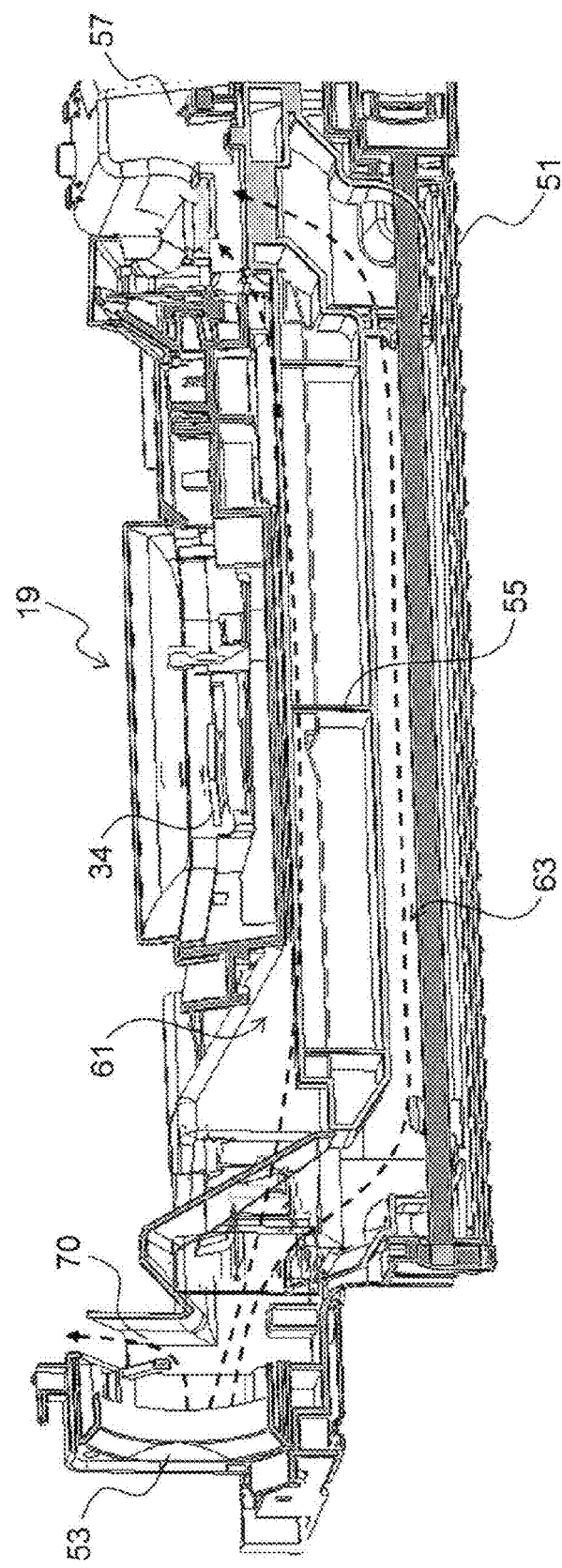
FIG. 9 is a side sectional view illustrating the entire flow of airflow introduced into an apparatus body 1a by an intake fan 53.

Furthermore, as illustrated in FIG. 5, a second duct 63 is formed between the lower duct part 55a and the connection frame 50c. FIG. 9 is a side sectional view illustrating the entire flow of the airflow introduced into the apparatus body 1a by the intake fan 53.

As illustrated in FIG. 9, the second duct 63 guides the air flow from the intake fan 53 up to the exhaust port 57 by allowing the air flow to pass through the vicinity of the cleaning device 17 (the drum unit 51). Furthermore, in the vicinity of the intake fan 53, a third duct 70 is provided to guide the air flow from the intake fan 53 toward the rear side (the left side of FIG. 1) of the apparatus body 1a, to allow the air flow to pass through the vicinity of the conveyance motor 80 (see FIG. 1), and to exhaust the air flow to the exterior of the apparatus body 1a.

As described above, the first duct 61, the second duct 63, and the third duct 70 branched from one intake fan 53 are provided, so that it is possible to simultaneously cool the drum unit 51 and the conveyance motor 80 in addition to the rotating shaft 41 of the polygon motor 39. Furthermore, since the duct member 55 forming the first duct 61 has the duct shape of the second duct 63 and the third duct 70, it is also possible to reduce the number of members.

Other technologies of the present disclosure are not limited to the aforementioned embodiment, and various types of modification can be made without departing from the scope of the present disclosure. For example, in the aforementioned embodiment, the first inclination surface 65 is formed on the bottom surface of the first duct 61 and the second inclination surface 67 is formed on one inner side surface thereof, so that airflow flowing inside the first duct 61 has been induced to the part of the rotating shaft 41 exposed into the first duct 61.

However, in order to more efficiently induce the airflow, the second inclination surface 67 may also be formed on both inner side surfaces of the first duct 61, or an inclination surface may also be formed on the top surface of the first duct 61.

Moreover, at the upstream side of the part of the rotating shaft 41 exposed into the first duct 61 with respect to the flow direction of the airflow, when an inner surface of the first duct 61 is formed as a smoothly continuing curved surface and is configured to be converged in an approximately conical shape (a tapered shape) toward the part of the rotating shaft 41 exposed into the first duct 61, the airflow flowing inside the first duct 61 can be more smoothly concentrated toward the part of the rotating shaft 41 exposed into the first duct 61 without loss.

Furthermore, although an effect is slightly reduced as compared with the aforementioned embodiment, it is also possible to employ a configuration of forming only the first inclination surface 65 or a configuration of forming only the second inclination surface 67.

Furthermore, the aforementioned embodiment has described the configuration in which the duct member 55 forming the first duct 61 has the duct shape of the second duct 63 and the third duct 70. However, the technology of the present disclosure is not limited thereto. For example, it may also be possible to employ a configuration in which the duct member 55 has the duct shape of any one of the second duct 63 and the third duct 70.

Furthermore, the technology of the present disclosure is not limited to the monochrome printer as illustrated in FIG. 1. It is of course that the technology of the present disclosure can be applied to various image forming apparatuses provided with an optical scanning device, such as a tandem or rotary type color copy machine and color printer, a monochrome copy machine, a digital multifunctional peripheral, and facsimile.

As described above, the technology of the present disclosure can be used in an image forming apparatus provided with an optical scanning device that forms an image on a surface to be scanned by exposure scanning using a rotating polygon mirror, such as a copy machine, a printer, a facsimile, and a multifunctional peripheral thereof. When the technology of the present disclosure is used, it is possible to provide an image forming apparatus capable of efficiently blowing airflow in the vicinity of a rotating shaft of a motor for rotationally driving the rotating polygon mirror by using a simple configuration, and sufficiently suppressing an increase in the internal temperature of the optical scanning device.

What is claimed is:

1. An image forming apparatus comprising:
    an optical scanning device including a rotating polygon mirror that deflects and scans beam light from a light source unit with respect to a surface to be scanned, a motor having a rotating shaft to which the rotating polygon mirror is fixed and rotationally driving the rotating polygon mirror, and a housing that accommodates the rotating polygon mirror and the motor;
    a duct having a rectangular section and disposed adjacent to the optical scanning device, a part of the rotating shaft being exposed into the duct; and
    a cooling fan that generates airflow which flows inside the duct,
    wherein, at a position close to where the part of the rotating shaft is exposed into the duct and upstream of the part of the rotating shaft exposed into the duct with respect to a flow direction of the airflow in the duct, a sectional area of the duct becomes gradually smaller toward the part of the rotating shaft exposed into the duct in the flow direction of the airflow in the duct, the sectional area of the duct is smallest at a position where the part of the rotating shaft is provided, and downstream of the position where the part of the rotating shaft is provided, the sectional area of the duct becomes larger than the smallest sectional area.

2. The image forming apparatus of claim 1, wherein from the position close to where the part of the rotating shaft is exposed into the duct and upstream of the part of the rotating shaft exposed into the duct with respect to the flow direction of the airflow in the duct, an inner wall surface of the duct is provided with an inclination surface which is inclined toward the part of the rotating shaft exposed into the duct.

3. The image forming apparatus of claim 1, wherein from the position close to where the part of the rotating shaft is exposed into the duct and upstream of the part of the rotating shaft exposed into the duct with respect to the flow direction of the airflow in the duct, an inner wall surface of the duct is converged in a tapered shape toward the part of the rotating shaft exposed into the duct.

4. The image forming apparatus of claim 1, further comprising an exhaust port to exhaust the airflow to an exterior of the image forming apparatus, wherein the duct is defined by the housing of the optical scanning device and a duct member abutting the housing, and includes a first duct that guides the airflow from the cooling fan to the exhaust port by allowing the airflow to pass through below the optical scanning device.

5. The image forming apparatus of claim 4, wherein the duct member further defines a second duct that leads the airflow from the cooling fan to a drum unit in the image forming apparatus and a third duct that leads the airflow from the cooling fan to a conveyance motor.

6. The image forming apparatus of claim 2, wherein
    the inclination surface is formed at an inner side of a bottom surface of the duct facing the part of the rotating shaft exposed into the duct, and
    the inner side of the bottom surface is further formed with a flat surface extending from an end part of a downstream side of the inclination surface along the flow direction of the airflow in the duct, and a vertical surface extending from an end part of a downstream side of the flat surface in a direction away from the part of the rotating shaft exposed into the duct and parallel to an axial direction of the part of the rotating shaft exposed into the duct.

\* \* \* \* \*